(12) United States Patent
Hirata et al.

(10) Patent No.: US 7,946,939 B2
(45) Date of Patent: May 24, 2011

(54) SLIPPAGE PREVENTION MECHANISM FOR TOOTHED ENDLESS TORQUE TRANSMISSION MEMBER

(75) Inventors: Takuya Hirata, Yokohama (JP); Noriyoshi Maruyama, Fijisawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 248 days.

(21) Appl. No.: 11/783,259

(22) Filed: Apr. 6, 2007

(65) Prior Publication Data
US 2007/0249445 A1  Oct. 25, 2007

(30) Foreign Application Priority Data
Apr. 7, 2006  (JP) .................. 2006-106006

(51) Int. Cl.
*F16H 7/18* (2006.01)
*F16H 57/02* (2006.01)
(52) U.S. Cl. ...................... 474/140; 474/144
(58) Field of Classification Search .............. 474/111, 474/140, 84, 86, 87, 109, 117, 144; 123/90.1
See application file for complete search history.

(56) References Cited

U.S. PATENT DOCUMENTS

| | | | | |
|---|---|---|---|---|
| 151,256 A * | 5/1874 | Walker | .......... | 474/133 |
| 1,288,550 A * | 12/1918 | Forsyth | .......... | 474/140 |
| 1,704,532 A * | 3/1929 | Curtis | .......... | 474/135 |
| 2,355,003 A * | 8/1944 | McCann | .......... | 184/16 |
| 2,718,153 A * | 9/1955 | Dean | .......... | 474/140 |
| 3,979,964 A * | 9/1976 | McCordall | .......... | 474/69 |
| 4,480,603 A * | 11/1984 | Tsuboi | .......... | 123/90.31 |
| 4,492,304 A * | 1/1985 | Geis | .......... | 198/837 |
| 5,306,212 A * | 4/1994 | Eberle | .......... | 474/140 |
| 5,366,418 A * | 11/1994 | Fukushima et al. | .......... | 474/111 |
| 5,427,582 A * | 6/1995 | Iwao et al. | .......... | 474/111 |
| 5,730,673 A * | 3/1998 | Schnupke et al. | .......... | 474/110 |
| 5,846,150 A * | 12/1998 | Wigsten | .......... | 474/140 |
| 6,336,881 B1 * | 1/2002 | Rapp et al. | .......... | 474/111 |
| 2007/0173362 A1 | 7/2007 | Ullein | | |

(Continued)

FOREIGN PATENT DOCUMENTS

GB  2316128 A  *  2/1998

(Continued)

OTHER PUBLICATIONS

Akatsuka et al (JP 52021562) English translation.*

*Primary Examiner* — Robert A Siconolfi
*Assistant Examiner* — Stephen Bowes
(74) *Attorney, Agent, or Firm* — Foley & Lardner LLP (57) ABSTRACT

A sprocket (3A, 3B) is fixed onto a crank shaft (2) projecting outward from a cylinder block (1) of an internal combustion engine (100). A timing chain (7A, 7B) is looped around the sprocket (3A, 3B). A slippage prevention mechanism (10) which prevents slippage of the timing chain (7A, 7B) with respect to the sprocket (3A, 3B) comprises an arm (10C) extending from a base portion (10A) fixed to the cylinder block. A slippage prevention rail (10B) in the form of an arc-shaped recess is formed on the arm (10C) so as to face the engaging part between the sprocket (3A, 3B) and the timing chain (7A, 7B) with a clearance smaller than the height of a tooth of the sprocket (3A, 3B) therebetween. The slippage prevention rail (10B) thus constructed does not interfere with other members fixed onto the crank shaft (2).

8 Claims, 7 Drawing Sheets

U.S. PATENT DOCUMENTS

2010/0167855 A1    7/2010    Ullein

FOREIGN PATENT DOCUMENTS

| | | | |
|---|---|---|---|
| JP | 52021562 A | * | 2/1977 |
| JP | 61-41947 U | | 3/1986 |
| JP | 63-105707 U | | 7/1988 |
| JP | 5-86893 A | | 4/1993 |
| JP | 05280604 A | * | 10/1993 |
| JP | 06017893 A | * | 1/1994 |
| JP | 10-246297 A | | 9/1998 |
| JP | 10281243 A | * | 10/1998 |
| WO | WO 2005/085675 A1 | | 9/2005 |

* cited by examiner

SLIPPAGE PREVENTION MECHANISM FOR TOOTHED ENDLESS TORQUE TRANSMISSION MEMBER

FIELD OF THE INVENTION

This invention relates to the prevention of slippage of a timing chain or toothed timing belt in an internal combustion engine.

BACKGROUND OF THE INVENTION

In order to prevent a timing chain from slipping on a drive sprocket fixed onto a crank shaft of an internal combustion engine, JPH10-246297A, published by Japan Patent Office in 1998, discloses a timing chain drive device provided with a slippage prevention rail.

The timing chain is looped around the drive sprocket, a driven sprocket fixed onto a cam shaft for an intake valve, and a driven sprocket fixed onto a cam shaft for an exhaust valve.

The slippage prevention rail is disposed in a position on the outside of an engaging part between the timing chain and the drive sprocket so as to prevent the timing chain from displacing radially outward.

The sprockets and the timing chain are disposed on the outside of a cylinder block and a cylinder head of the internal combustion engine, and enclosed in a chain case fitted to the cylinder block.

The timing chain drive device comprises a tension rail on a downstream side of the drive sprocket with respect to the travel direction of the timing chain. The tension rail is designed to provide the timing chain with a tensile force by pressing the timing chain inward as well as to guide the travel of the timing chain. The timing chain drive device also comprises a fixed guide located on the upstream side of the drive sprocket with respect to the travel direction of the timing chain for guiding the travel of the timing chain.

The slippage prevention rail is constructed to project toward the cylinder block from the chain case, and has a sufficient width to cover substantially the entire width of the timing chain. The slippage prevention rail prevents lubricant from scattering from the engaging part between the timing chain and the drive sprocket, and ensures a supply of lubricant to the friction surface between the tension rail and the timing chain, thereby preventing wear of the tension rail and extensional deformation of the timing chain.

SUMMARY OF THE INVENTION

In an internal combustion engine in which an auxiliary sprocket for driving an oil pump or a signal plate for measuring an angular position of the internal combustion engine is fixed onto the crank shaft between the drive sprocket and the chain case, the slippage prevention rail projecting toward the cylinder block from the chain case may interfere with the auxiliary sprocket or the signal plate when the chain case is fitted to the cylinder block.

The slippage prevention rail may also interfere with the auxiliary sprocket or the signal plate when the chain case is removed from the cylinder block or fitted to the cylinder block again, during maintenance of the timing chain in the chain case.

It is therefore an object of this invention to prevent a slippage prevention rail from interfering with the other members in the chain case.

In order to achieve the above object, this invention provides a slippage prevention mechanism for a toothed endless torque transmission member which is looped around a sprocket fixed onto a crank shaft of an internal combustion engine on the outside of a cylinder block.

The slippage prevention mechanism comprises a base portion fixed to the cylinder block on the outside of the cylinder block, an arm extending from the base portion in a perpendicular direction to the crank shaft, and a slippage prevention rail formed on the arm to prevent slippage of the toothed endless torque transmission member with respect to the sprocket.

The details as well as other features and advantages of this invention are set forth in the remainder of the specification and are shown in the accompanying drawings.

DESCRIPTION OF THE PREFERRED EMBODIMENTS

Figure 1:
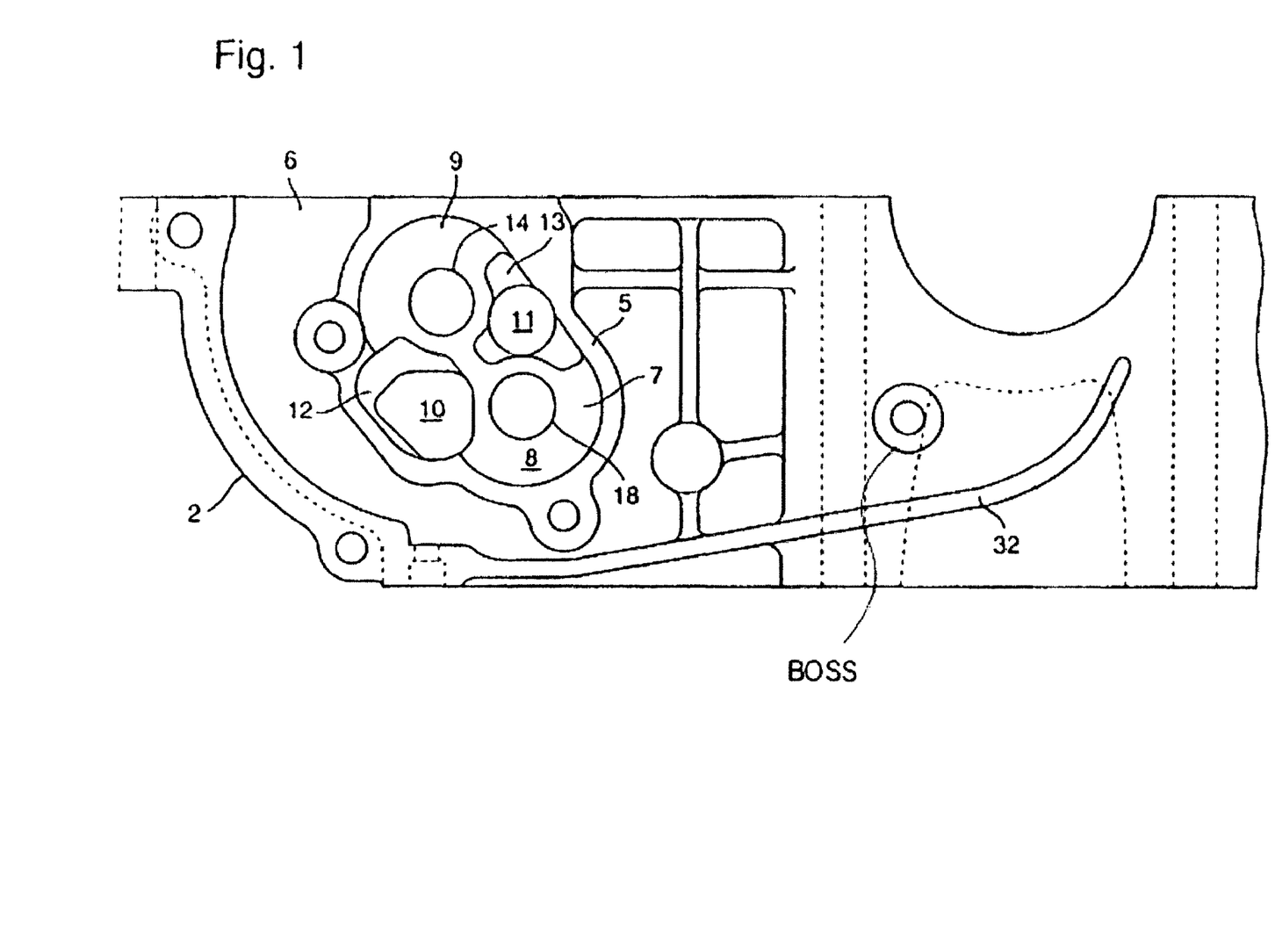
FIG. 1 is a front view of an internal combustion engine including a slippage prevention mechanism for a timing chain according to this invention in a state where a chain case and a signal plate are removed.

Referring to FIG. 1 of the drawings, a V-shaped internal combustion engine 100 for a vehicle comprises two cylinder heads 4A, 4B and a common cylinder block 1. A crank shaft 2 of the internal combustion engine 100 projects to the outside of the cylinder block 1.

Figure 6:
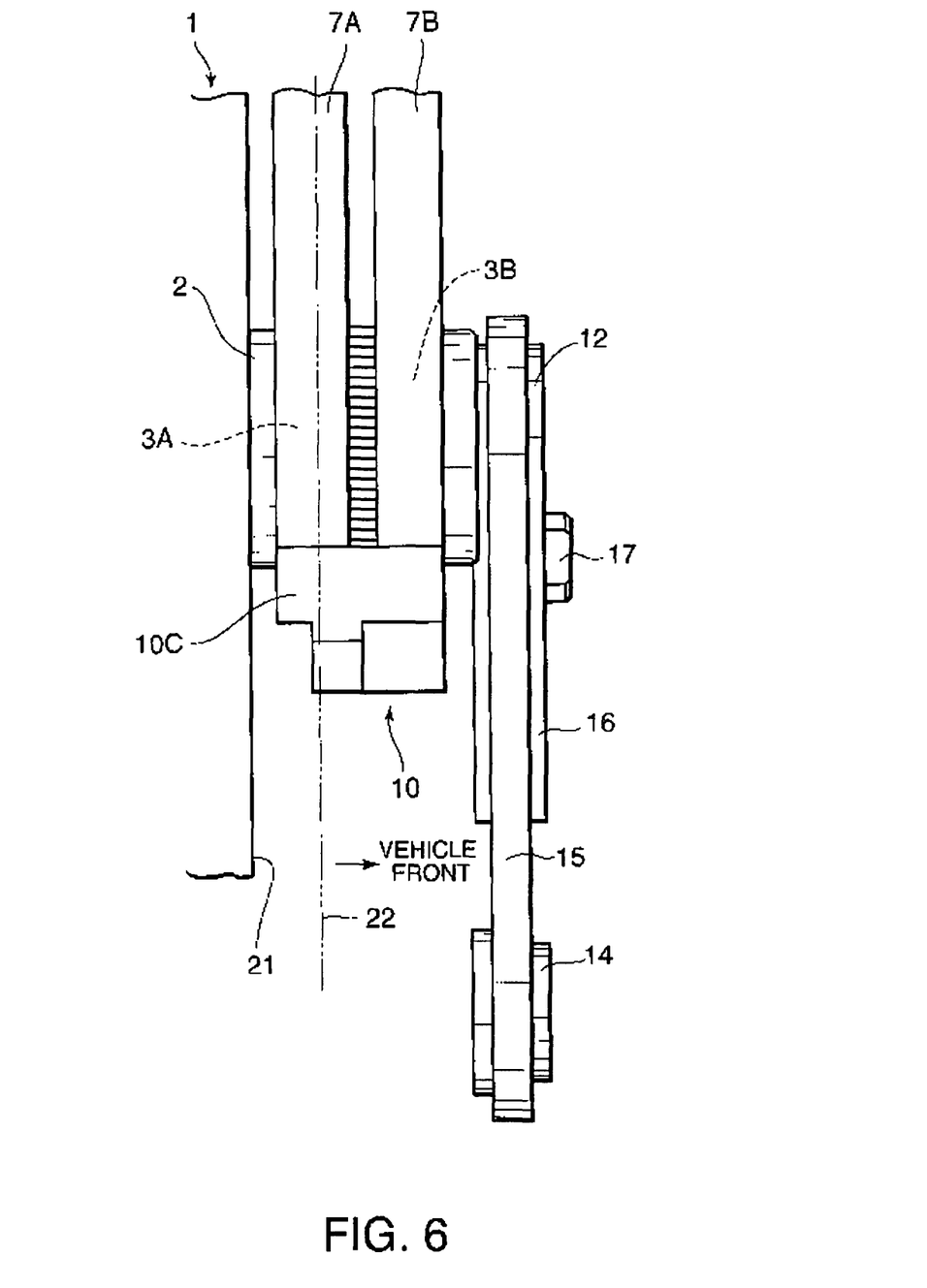
FIG. 6 is a front view of the slippage prevention mechanism.

Referring to FIG. 6, two drive sprockets 3A and 3B are fixed onto the crank shaft 2 on the outside of the cylinder block 1.

Referring again to FIG. 1, an intake cam shaft 5 of intake cams for opening and closing intake valves and an exhaust cam shaft 6 of exhaust cams for opening and closing exhaust valves project to the outside of the cylinder heads 4A and 4B. A driven sprocket 5A is fixed onto a projecting end of the intake cam shaft 5, and a driven sprocket 6A is fixed onto a projecting end of the exhaust cam shaft 6.

In order to transfer the rotation of the drive sprocket 3A to the driven sprocket 5A and the driven sprocket 6A of the cylinder head 4A, a timing chain 7A is looped around these sprockets 3A, 5A, and 6A.

In order to transfer the rotation of the drive sprocket 3B to the driven sprocket 5A and the driven sprocket 6A of the cylinder head 4B, a timing chain 7B is looped around these sprockets 3B, 5A, and 6A.

Assuming that all the sprockets 3A, 3B, 5A, 6A rotate clockwise in the figure, the timing chains 7A and 7B also travel clockwise. Fixed rails 8A for guiding the timing chains 7A and 7B, respectively, are both disposed on the upstream side of the drive sprockets 3A and 3B with respect to the travel direction of the timing chains 7A and 7B, Movable tension rails 8B which respectively press the timing chains 7A and 7B inward using resilient forces generated respectively by chain tensioners 9 are disposed on the downstream side of the drive sprockets 3A and 3B with respect to travel direction of the timing chains 7A and 7B. The movable tension rails 8A and 8B are kept in a state of constant contact with the timing chains 7A and 7B respectively.

A slippage prevention mechanism 10 is provided underneath the drive sprocket 3A and 3B for preventing slippage of the timing chains 7A and 7B. A base portion 10A of the slippage prevention mechanism 10 is fixed to a skirt 1A forming a lowermost portion of the cylinder block 1, which is connected to an oil pan 11. The slippage prevention mechanism 10 comprises an arm 10C extending from the base portion 10A in a perpendicular direction to the crank shaft 2 and intersects therewith in an offset position.

An arc-shaped recess 10B facing upward is formed on a tip of the arm 10C as a slippage prevention rail. The arc-shaped recess 10B faces the timing chain 7A engaged with the drive sprocket 3A and the timing chain 7B engaged with the drive sprocket 3B from beneath with a predetermined clearance therebetween.

Herein, the predetermined clearance is set within a displacement range of the timing chain 7A (7B) in the radial direction within which the engagement between the timing chain 7A(7B) and the drive sprocket 3A(3B) is maintained. Specifically, this condition is satisfied by setting the predetermined clearance smaller than the height of a tooth of the drive sprocket 3A(3B).

Referring again to FIG. 6, the width of the arc-shaped recess 10B is set to be equal to the distance from a side surface facing the internal combustion engine 100 on the timing chain 7A engaged with the drive sprocket 3A to a side surface separated from the internal combustion engine 100 on the timing chain 7B engaged with the drive sprocket 3B. The length of the arc-shaped recess 10B in the circumferential direction is set to a value that can cover both an engaging part between the timing chain 7A and the drive sprocket 3A and an engaging part between the timing chain 7B and the drive sprocket 3B. According to this setting of the size of arc-shaped recess 10B, the scattering of lubricant from the engaging part between the timing chain 7A (7B) and the drive sprocket 3A(3B) is prevented without failure.

The drive sprockets 3A and 3B, the driven sprockets 5A and 6A, the timing chains 7A and 7B, the fixed rails 8A, the tension rails 8B, the chain tensioners 9, and the slippage prevention mechanism 10 described above form a timing chain drive device.

Figure 5:
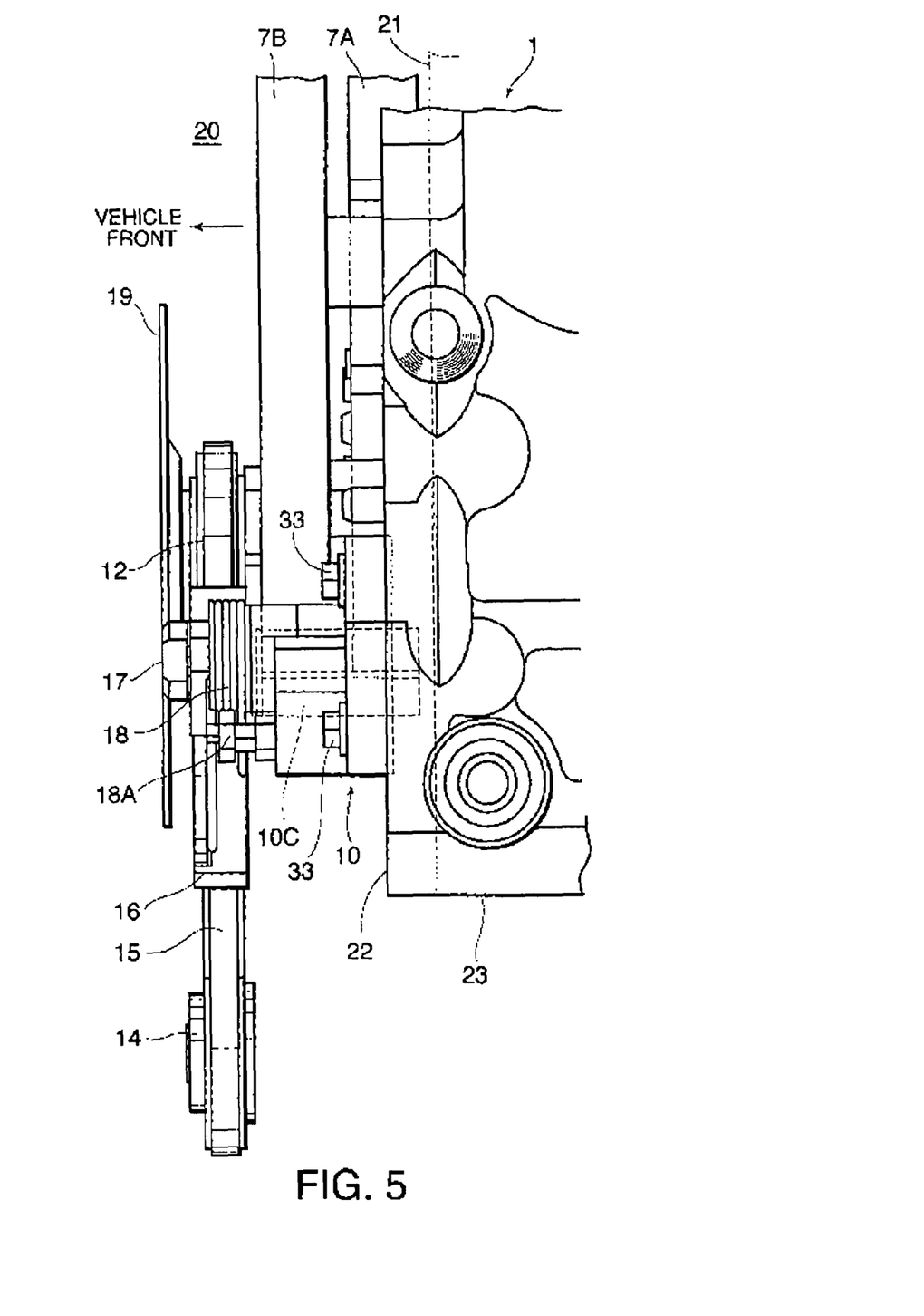
FIG. 5 is a rear view of the slippage prevention mechanism seen along the direction V-V in FIG. 3.

Referring to FIG. 5, the crank shaft 2 penetrates the drive sprockets 3A and 3B. A pump drive sprocket 12 serving as an auxiliary sprocket for driving an oil pump and a signal plate 19 for detecting an angular position of the internal combustion engine 100 are fixed onto a penetrating end of the crank shaft 2. The internal combustion engine 100 is mounted on a vehicle in a position to cause the signal plate 19 to face the forward direction of the vehicle.

Referring again to FIG. 1, a driven sprocket 14 is fixed onto a pump shaft 13 of the oil pump. A chain 15 is looped around the pump drive sprocket 12 and the driven sprocket 14 as an auxiliary endless torque transmission member.

Figure 2:
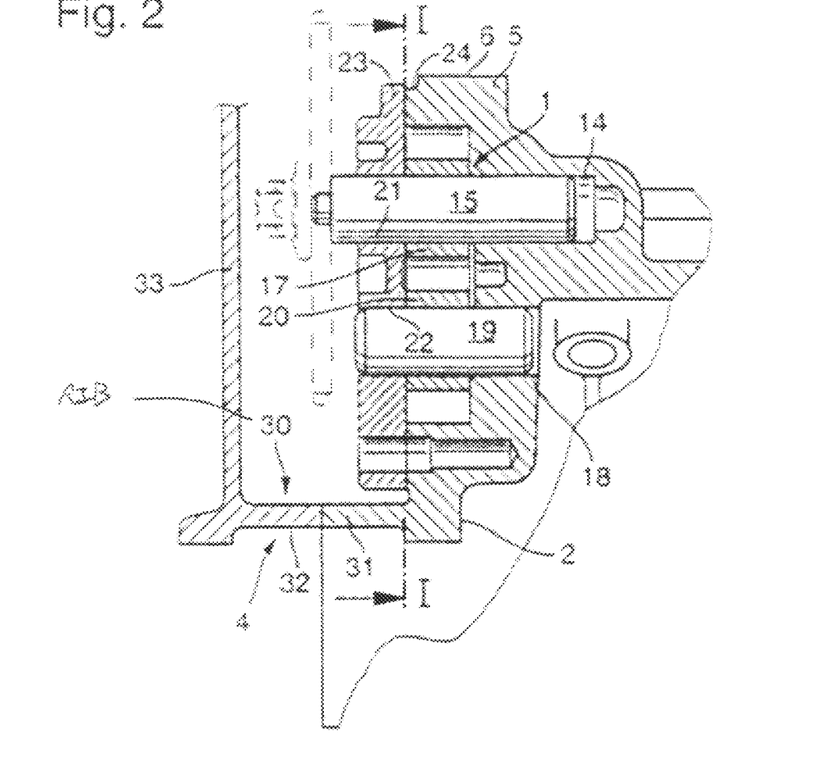
FIG. 2 is a side view of the slippage prevention mechanism.

Referring to FIG. 2, a chain tensioner 16 for pressing the chain 15 inward to remove slackness therein is provided on the downstream side of the pump drive sprocket 12 with respect to the rotation direction of the pump drive sprocket 12.

Figure 7:
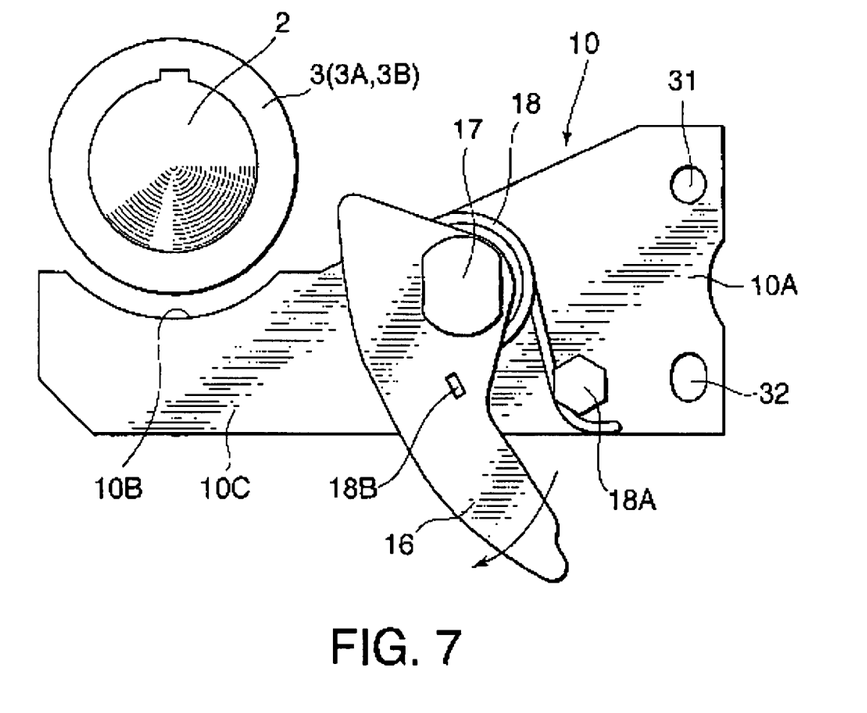
FIG. 7 is a side view of the slippage prevention mechanism.

Referring to FIG. 7, the chain tensioner 16 is supported so as to swing about a pin 17 fixed to a central part of the arm 10C of the slippage prevention mechanism 10. The chain tensioner 16 comprises an arc-shaped pressing surface contacting the outer circumferential surface of the chain 15. A torsion coil spring 18 an end of which is supported by a bolt 18A projecting from the arm 10C in the separating direction from the cylinder block 1 exerts a rotational force on the chain tensioner 16 as shown by the arrow in the figure. According to this rotational force, the chain tensioner 16 pushes the chain 15 inward as shown in FIG. 3.

Figure 3:
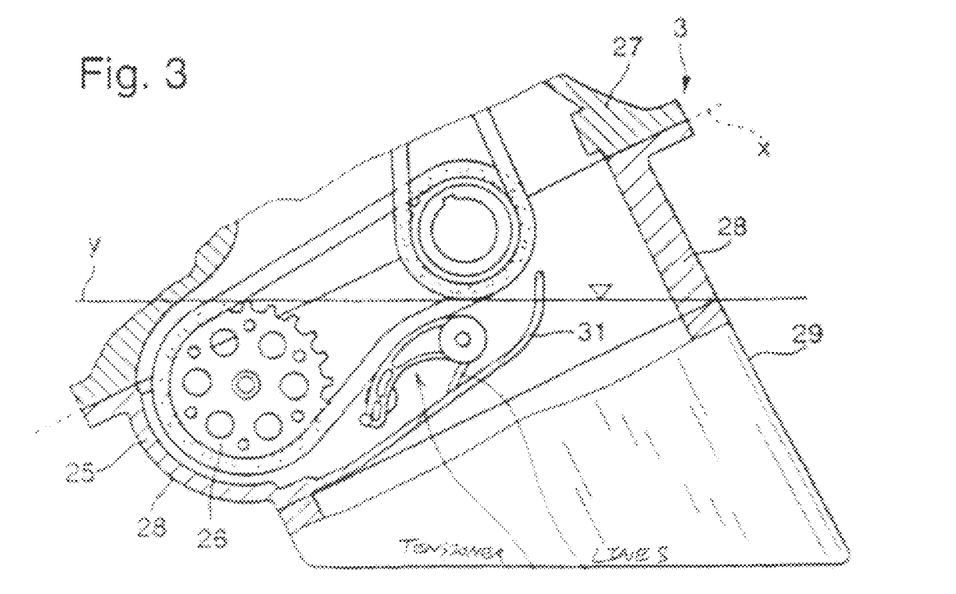
FIG. 3 is a side view of essential parts of the internal combustion engine in a state where the chain case is removed.
Figure 4:
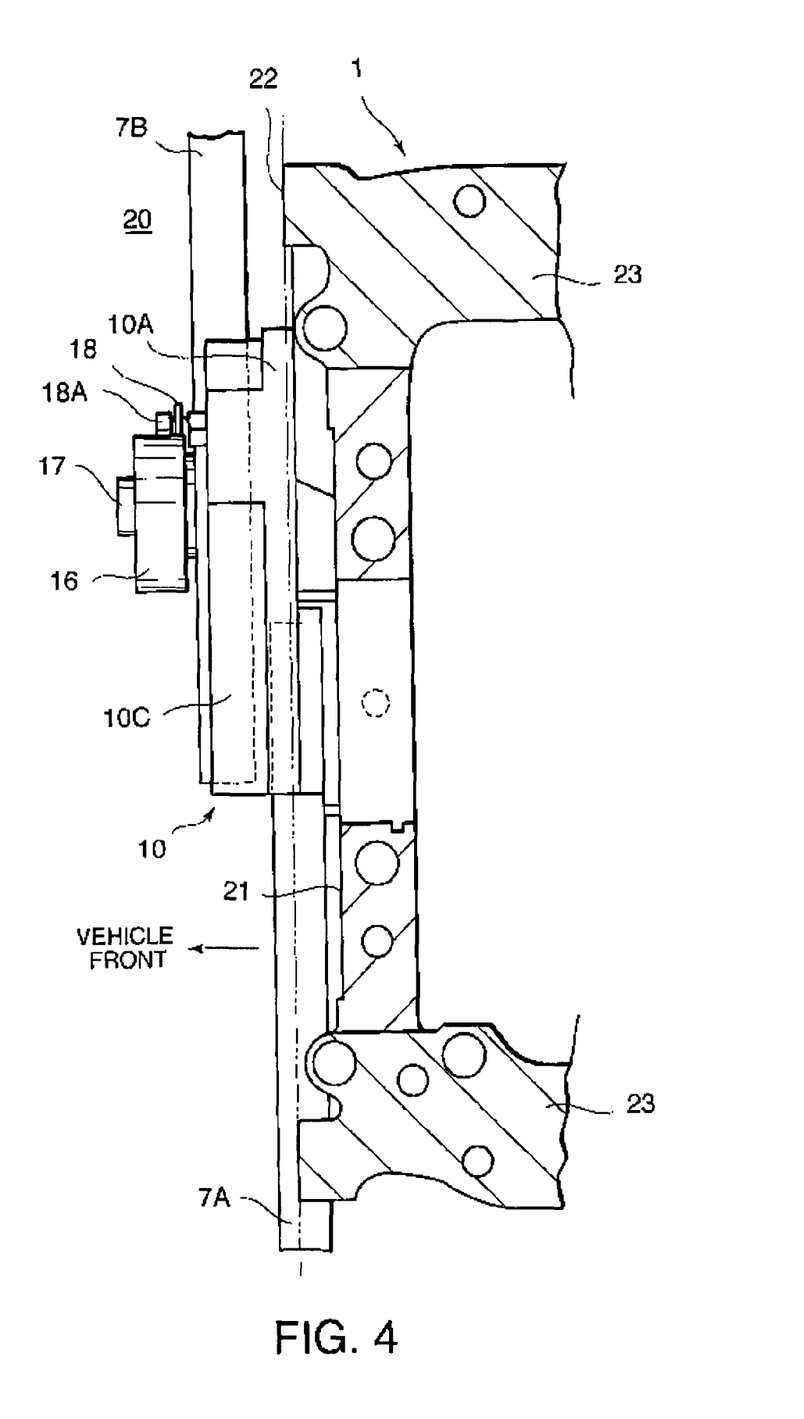
FIG. 4 is a bottom view of the slippage prevention mechanism seen along the direction IV-IV in FIG. 2.

Referring to FIGS. 3-5, the timing chain drive device and the oil pump drive device are enclosed in a chain enclosing space 20 which is formed by a wall surface 21 and the chain case fitted thereto. The wall surface 21 corresponds to the outer surface of the cylinder block 1 and the cylinder heads 4A, 4B of the internal combustion engine 100 facing the forward direction of the vehicle. The internal combustion engine 100 comprises a joint surface 22 projecting from the wall surface 21 such that the chain case is jointed thereto. A part of the timing chain drive device and oil pump drive device is located in the recessed area surrounded by the joint surface 22. A joint surface 23 is formed on the lower end of the skirt 1A so as to connect to the oil pan 11.

Referring again to FIG. 6, when the crank shaft 2 projecting in the forward direction of the vehicle, or in other words in the separating direction from the cylinder block 1, is viewed from a lateral direction thereto, the drive sprocket 3A engaged with the timing chain 7A, the drive sprocket 3B engaged with the timing chain 7B, and the pump drive sprocket 12 engaged with the chain 15 of the oil pump drive device are disposed in this order in a direction extending from the wall surface 21 toward the front of the vehicle.

Referring again to FIG. 5, the signal plate 19 is further fixed onto the crank shaft 2 in front of the pump drive sprocket 12. Although not shown in the drawings, the crank shaft 2 penetrates the chain case and a pulley for driving a further other equipment is fixed onto the penetration end on the outside of the chain case.

Since the drive sprocket 3A is disposed near to the wall surface 21, its side face facing the wall surface 21 is located in the recessed area surrounded by the joint surface 22. Accordingly, a part of the drive sprocket 3A and the timing chain 7A is disposed in the recessed area, and the other part of the drive sprocket 3A and the timing chain 7A projects from the joint surface 22 in the forward direction of the vehicle or in the separating direction from the cylinder block 1.

Referring to FIG. 7, a pair of attachment holes comprising a round hole 31 and an elongated hole 32 are formed through the base portion 10A of the slippage prevention mechanism 10. The length of the short axis of the elongated hole 32 is equal to the diameter of the round hole 31, and the round hole 31 is located on the extension of the long axis of the elongated hole 32.

Figure 8:
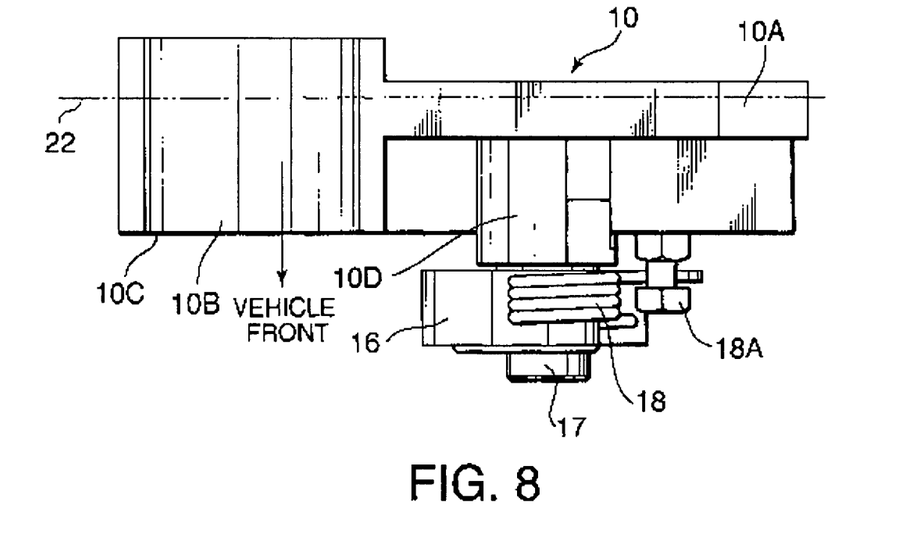
FIG. 8 is a plan view of the slippage prevention mechanism.
Figure 9:
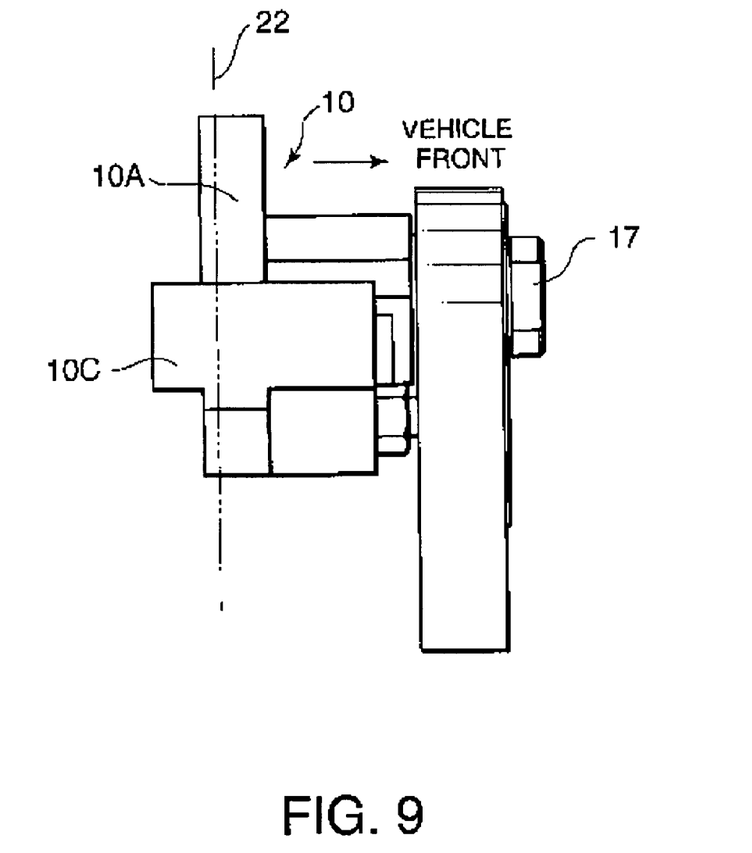
FIG. 9 is a front view of the slippage prevention mechanism including a chain tensioner.

Referring to FIG. 8, a boss part 10D is formed on the central portion of the arm 10C so as to fix the pin 17. The boss part 10D projects in the forward direction of the vehicle. The side face of the arm 10C facing the forward direction of the vehicle is located in an advanced position in the forward direction of the vehicle with respect to the joint surface 22 and a fixing surface of the base portion 10A fixed to the skirt 1A. The boss part 10D projects further in the forward direction of the vehicle from the side face of the arm 10C facing the forward direction of the vehicle. The width of the arc-shaped recess 10B is set equal to the width of the space occupied by the drive sprockets 3A and 3B. According to the above configurations, the arm 10C and the chain tensioner 16 of the slippage prevention mechanism 10 are offset from each other along the axial direction of the crank shaft 2.

As described heretofore, an end of the torsion coil spring 18 is supported by the bolt 18A. The other end of the torsion coil spring 18 is bent toward the chain tensioner 16 and inserted into a hole 18B formed in the chain tensioner 16. According to this construction, the torsion coil spring 18 applies a resilient force to the chain tensioner 16 in the clockwise direction in FIG. 7.

Referring again to FIG. 5, the base portion 10A of the slippage prevention mechanism 10 is fixed to the fixing surface of the skirt 1A by reamer bolts 33. The fixing surface forms a substantially common vertical surface with the joint surface 22. On the fixing surface, a pair of screw holes are alined vertically. The reamer bolts 33 are screwed into the screw holes in a state where the round hole 31 and the elongated hole 32 of the base portion 10A are placed on the screw holes. It should be noted that the screw holes formed on the fixing surface of the skirt 1A have a circular cross-section with a diameter equal to the diameter of the round hole 31 or the length of the short axis of the elongated hole 32.

Referring again to FIG. 2, by forming the elongated hole 32 as one of the attachment holes provided in the base portion 10A, a tolerance to dimensional error in the distance between the pair of screw holes can be ensured.

The arm 10C expands to both sides of the joint surface 22 as shown in FIGS. 4 and 6. As described heretofore, the drive sprocket 3A and the timing chain 7A also expand to both sides of the joint surface 22. The chain tensioner 16 is located in the same position as the chain 15 in the direction along the crank shaft 2 as shown in FIG. 5.

The slippage prevention mechanism 10 thus constructed comprises the base portion 10A fixed to the skirt 1A of the cylinder block 1, and the arm 10C extending from the base portion 10A to a position underneath the drive sprockets 3A, 3B fixed respectively to the crank shaft 2. When the pump drive sprocket 12 and the signal plate 19 are further fixed onto the crank shaft 2 penetrating the drive sprocket 3A, 3B, the slippage prevention mechanism 10 does not interfere with the pump drive sprocket 12 and the signal plate 19.

The base portion 10A fixed directly to the skirt 1A of the cylinder block 1 can maintain the clearance between the timing chains 7A, 7B and the arc-shaped recess 10B more precisely than in the case where the slippage prevention rail is fixed to the chain case.

Further, since the chain tensioner 16 is supported by a pin 17 projecting from the boss part 10D of the arm 10 in the forward direction of the vehicle, the chain tensioner 16 is supported in an offset position from the slippage prevention rail in the forward direction of the vehicle. The chain tensioner 16 therefore does not interfere with the slippage prevention rail. Further, supporting the chain tensioner 16 by the slippage prevention mechanism 10 facilitates layout of the members of the oil pump drive device.

The contents of Tokugan 2006-106006, with a filing date of Apr. 7, 2006 in Japan, are hereby incorporated by reference.

Although the invention has been described above with reference to a certain embodiment of the invention, the invention is not limited to the embodiment described above. Modifications and variations of the embodiments described above will occur to those skilled in the art, within the scope of the claims.

For example, in the above embodiment, the drive sprockets 3A, 3B, the pump drive sprocket 12, and the signal plate 19 are aligned in this order on the crank shaft 2 from the wall surface 21 of the cylinder block 1 towards the vehicle front.

However, this invention is also applicable to an internal combustion engine in which the pump drive sprocket 12, drive sprockets 3A, 3B, and signal plate 19 are aligned in this order on the crank shaft 2 from the wall surface 21 towards the vehicle front. This invention is also applicable to an internal combustion engine in which the signal plate 19, drive sprockets 3A, 3B, and pump drive sprocket 12 are aligned in this order on the crank shaft 2 from the wall surface 21 towards the vehicle front.

Irrespective of the above variations in the order of the members aligned on the crank shaft 2, this invention can be implemented by simply modifying the relationship of the locations of the arm 10C and the chain tensioner 16 with respect to the wall surface 21 in the direction along the crank shaft 2.

Although the embodiment described above is a slippage prevention mechanism for timing chains 7A, 7B, this invention can be applied in preventing slippage of a toothed timing belt. The toothed endless torque transmission member in the title is a generic expression including a timing chain and a toothed timing belt.

The chain 15 whose tensile force is regulated by the chain tensioner 16 is a chain for driving an oil pump, but the chain tensioner 16 may be used for regulating the tensile force of a chain for driving different auxiliary equipment. It is also possible to replace the chain 15 with a belt and the chain tensioner 16 with a belt tensioner.

The embodiment described above is an application of this invention to a V-shaped internal combustion engine 100 having two drive sprockets 3A and 3B, but needless to say, this invention can be applied to an internal combustion engine that has only one drive sprocket.

The embodiments of this invention in which an exclusive property or privilege is claimed are defined as follows:

1. A slippage prevention mechanism for a toothed endless torque transmission member which is looped around a sprocket fixed onto a crank shaft of an internal combustion engine on the outside of a cylinder block, the internal combustion engine comprising an auxiliary sprocket fixed onto the crank shaft, the mechanism comprising:
    a base portion fixed directly to the cylinder block on the outside of the cylinder block;
    an arm extending from the base portion in a perpendicular direction to the crank shaft;
    a boss part projecting from the arm,
    a slippage prevention rail formed on the arm to prevent slippage of the toothed endless torque transmission member with respect to the sprocket, and
    a tensioner which is supported on the boss part so as to be free to swing and is configured to regulate a tensile force of an auxiliary endless torque transmission member looped around the auxiliary sprocket.

2. The slippage prevention mechanism as defined in claim 1, wherein the slippage prevention rail comprises an arc-shaped recess formed on the arm so as to face an engaging part of the toothed endless torque transmission member and the sprocket with a clearance therebetween, wherein engagement between the toothed endless torque transmission member and the sprocket is maintained within the clearance.

3. The slippage prevention mechanism as defined in claim 2, wherein the sprocket comprises teeth, and the clearance is set to be smaller than a height of a tooth of the sprocket.

4. The slippage prevention mechanism as defined in claim 1, wherein the tensioner is supported on the boss part projecting from the arm in a separating direction from the cylinder block so as to be free to swing.

5. The slippage prevention mechanism as defined in claim 4, wherein the tensioner comprises an arc-shaped pressing surface to press against the auxiliary endless torque transmission member.

6. The slippage prevention mechanism as defined in claim 5, further comprising a torsion coil spring interposed between the arm and the tensioner to bias the tensioner to swing in a direction to cause the pressing surface to press against the auxiliary endless torque transmission member.

7. The slippage prevention mechanism as defined in claim 1, wherein the base portion is fixed to the cylinder block by a bolt penetrating an elongated hole formed through the base portion.

8. The slippage prevention mechanism as defined in claim 1, wherein the arm extends in the perpendicular direction to a longitudinal axis of the crank shaft.

* * * * *